United States Patent [19]

Sato et al.

[11] Patent Number: 4,891,652

[45] Date of Patent: Jan. 2, 1990

[54] IMAGE RECORDING APPARATUS USING PLURAL TYPES OF ENERGY AND REVERSIBLE TRANSFER RECORDING MEDIUM CONVEYANCE

[75] Inventors: Tadashi Sato, Kokubunji; Shinnosuke Taniishi, Tokyo, both of Japan

[73] Assignee: Canon Kabushiki Kaisha, Tokyo, Japan

[21] Appl. No.: 22,051

[22] Filed: Mar. 5, 1987

[30] Foreign Application Priority Data

Mar. 10, 1986 [JP] Japan .................................. 61-50568

[51] Int. Cl.$^4$ .............................................. G01D 15/10

[52] U.S. Cl. ................................ 346/76 PH; 400/120

[58] Field of Search ................. 346/1.1, 76 PH, 76 R; 400/120

[56] References Cited

U.S. PATENT DOCUMENTS 4,604,632 8/1986 Matsumoto ........................... 346/24

FOREIGN PATENT DOCUMENTS 0067494 4/1983 Japan .................................. 400/120

*Primary Examiner*—B. A. Reynolds

*Assistant Examiner*—Huan Tran

*Attorney, Agent, or Firm*—Fitzpatrick, Cella, Harper & Scinto

[57] ABSTRACT

An image recording apparatus comprises: an image recording apparatus comprising: a recording section disposed along a conveyable route of a transfer recording medium having a transfer recording layer whose transfer characteristics change when a first energy and a second energy different from the first energy are applied thereto, the recording section including a first energy applying means for applying the first energy to the transfer recording medium and a second energy applying means for applying the second energy thereto; a transfer means for transferring an image formed on the transfer recording medium in the recording section to a recording medium; and conveying means capable of conveying the transfer recording medium in the direction from the recording section to the transfer section and vice versa.

28 Claims, 6 Drawing Sheets

IMAGE RECORDING APPARATUS USING PLURAL TYPES OF ENERGY AND REVERSIBLE TRANSFER RECORDING MEDIUM CONVEYANCE

BACKGROUND OF THE INVENTION

1. Field of the Invention

The present invention relates to an image recording apparatus applicable to printers, copying machines, electronic typewriters, facsimile equipment, and the like.

2. Related Background Art

In recent years, various kinds of information processing systems have been developed in conjunction with rapid progress made in the information industry. Recording methods and apparatus suitable for various information processing systems have also been developed and adopted. Among such recording methods, the thermal transfer recording method has been recently been used widely since the associated apparatus may be light in weight, compact and noise-free as well and excels in terms of operational features and maintenance capabilities.

The prior art heat transfer recording method is generally effected as follows: A heat transfer medium is used in which a thermal transfer ink with a coloring agent dispersed in a heat melting binder is applied to a sheet-like substrate, and this thermal transfer medium is superposed on a recording medium in such a manner that a thermal transfer ink layer will contact the recording medium. By supplying heat from the side of the thermal transfer medium's substrate by means of a thermal head to transfer the melted ink layer to the recording medium, a transferred ink image corresponding to the configuration of the heat supplied is formed on the recording medium. In accordance with this method, plain paper can be used as the recording medium.

However, conventional thermal transfer recording methods are not free from problems. In other words, with conventional thermal transfer recording methods, The transfer recording performance, i.e., the printing quality, is substantially affected by the smoothness of the surface of the recording medium. In the case of a recording medium with a low degree of smoothness, there usually results in a decline in the quality of images recorded.

In addition, if a multi-color image is to be obtained using a conventional thermal transfer recording apparatus, it is necessary to provide a plurality of thermal heads or provide either the transfer recording medium or the recording medium with complicated functions such as reverse feeding and stopping. Thus, there are problems in that the overall apparatus becomes large in size, complex, and that the recording speed declines.

Therefore, the present applicant invented image recording methods and transfer recording media which allow high-quality images to be recorded on a recording medium having a low degree of surface smoothness by overcoming the aforementioned problems of the prior art. In addition, the present applicant invented image recording methods and transfer recording media which allow multi-color images to be obtained without needing to have the recording medium perform complicated functions. The present applicant filed patent applications in Japan for these inventions as Japanese Patent Application Nos. 120080/1985 (filed on June 3, 1985), 120081/1985 (filed on June 3, 1985), 131411/1985 (filed on June 17, 1985), 134831/1985 (filed on June 20, 1985), 150597/1985 (filed on June 7, 1985), 199926/1985 (filed on Sept. 10, 1985), and 250884/1985 (filed on Nov. 11, 1985). Furthermore, on the basis of the priority rights afforded by these Japanese Applications, the present applicant filed an application in the United States (U.S. Ser. No. 869,689, filed on June 2, 1986) and a European application (Application No. 86107540.6, filed on June 3, 1986).

In addition, the present applicant further invented image recording apparatuses which are capable of effectively employing the aforementioned inventions, for which patent applications had been filed in Japan, the United States, and Europe. Thus, the present applicant filed patent applications in Japan for these inventions, and, on the basis of the priority rights afforded by these Japanese applications (priority date: Feb. 3, 1986), filed patent applications in the United States and Europe, the serial and application numbers thereof having not been given as yet.

The present invention which will be described below is a further development of the aforementioned inventions for which the present applicant filed the Japanese applications, the U.S. application, and the European application. The present invention can be applied, as necessary, to the image recording methods and transfer recording media described in the specifications of the aforementioned applications.

SUMMARY OF THE INVENTION

A primary object of the present invention is to provide an image recording apparatus which is capable of forming high-quality images on a recording medium with a low degree of surface smoothness (e.g., plain paper).

Another object of the present invention is to provide an image recording apparatus which is capable of effectively using a transfer recording medium without waste.

Still another object of the present invention is to provide an image recording apparatus which is capable of forming clear images.

A further object of the present invention is to provide an image recording apparatus which is capable of obtaining multi-color recorded images without the need to have a transfer recording medium or a recording medium perform complicated functions.

A still further object of the present invention is to provide an image recording apparatus which is capable of effecting in separate processes the formation of images on a transfer recording medium and the transfer of the images onto a recording medium.

To these ends, according to the present invention, there is provided an image recording apparatus comprising: a recording section disposed along a conveyable route of a transfer recording medium having a transfer recording layer whose transfer characteristics change when a first energy and a second energy different from the first energy are applied thereto, said recording section including a first energy applying means for applying the first energy applying means for applying the second energy thereto; a transfer means for transferring an image formed on the transfer recording medium in the recording section onto a recording medium; and conveying means capable of conveying the transfer recording medium in the direction from the recording section to the transfer section and vice versa.

These and other objects and features of the present invention will become apparent from the following detailed description of the invention when read in conjunction with the accompanying drawings.

DESCRIPTION OF THE PREFERRED EMBODIMENTS

Figure 1:
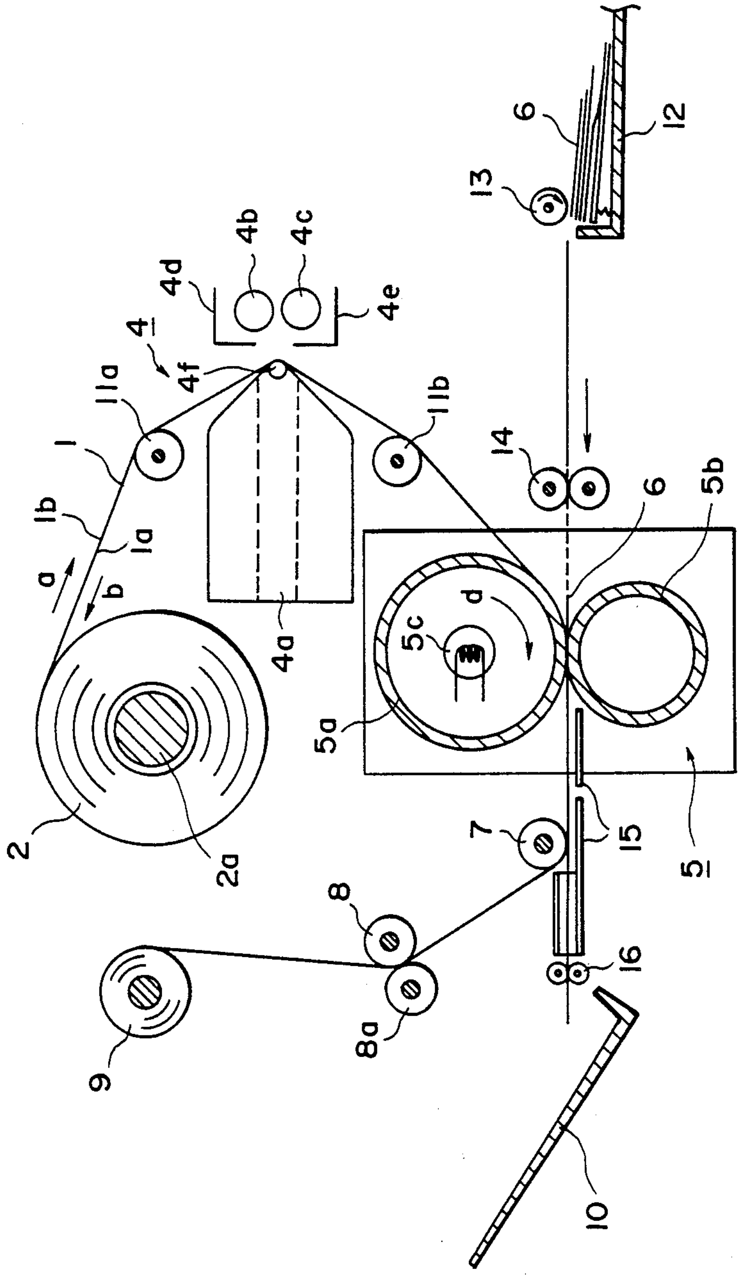
FIG. 1 is a side elevational view schematically illustrating an image recording apparatus to which an embodiment of the present invention is applied.

Referring now to the accompanying drawings, description will be made of embodiments of an image recording apparatus in accordance with the present invention. As mentioned before, it goes without saying that the embodiments of the present invention can, as necessary, be applied to the image recording methods and transfer recording media described in the specifications of the aforementioned applications.

In an image recording apparatus in accordance with the present invention, a transferred image is formed by varying the physical properties governing the transfer characteristics. These physical properties are determined, as required, in accordance with the kinds of transfer recording media used. For instance, in the case of a transfer recording medium in which transfer is effected after rendering a transfer image in a thermally melted state, the physical properties are determined by the melting temperature, the softening temperature, or the glass transfer point. In the case of a transfer recording medium in which transfer is effected after rendering a transfer image in an adhesive state or in a state in which it is capable of permeating a recording medium, the physical properties are determined by the viscosity at an identical temperature. In addition, a plurality of kinds of energy used for forming a transfer image can also be determined as required. For instance, optoelectronic beams, heat, pressure, or the like may be used in a suitable combination.

An embodiment which will be described hereafter is an image recording apparatus for recording an image on a recording medium by using a transfer recording medium having a transfer recording layer whose physical properties governing transfer characteristics change on application of light energy and heat energy thereto, said apparatus comprising a conveying means for conveying the transfer recording medium; a recording section disposed along a conveying route of the transfer recording medium and having a heating means for applying heat energy thereto and an irradiating means for applying light energy thereto; a transfer section for transferring a transferred image formed in the recording section onto the recording medium; and a means for allowing the conveying means to reversely feed the transfer recording medium from the transfer section in the direction of the recording section.

In accordance with the above-described apparatus, if recording is carried out by setting the recording medium and the roll sheet-like transfer recording medium in the apparatus, the transfer recording medium is consecutively paid out by the conveying means, an image is formed on application of predetermined heat energy and light energy in the recording section, and the image is formed in the transfer section.

After the formation of the image, the transfer recording medium which is conveyed from the recording section to the transfer section in an unused state can be fed reversely until the rear end portion of the image reaches the position of the recording section after the image has been transferred onto the recording medium. Consequently, it is possible to effectively use the transfer recording medium without causing the same to produce an unused portion.

Figure 2:
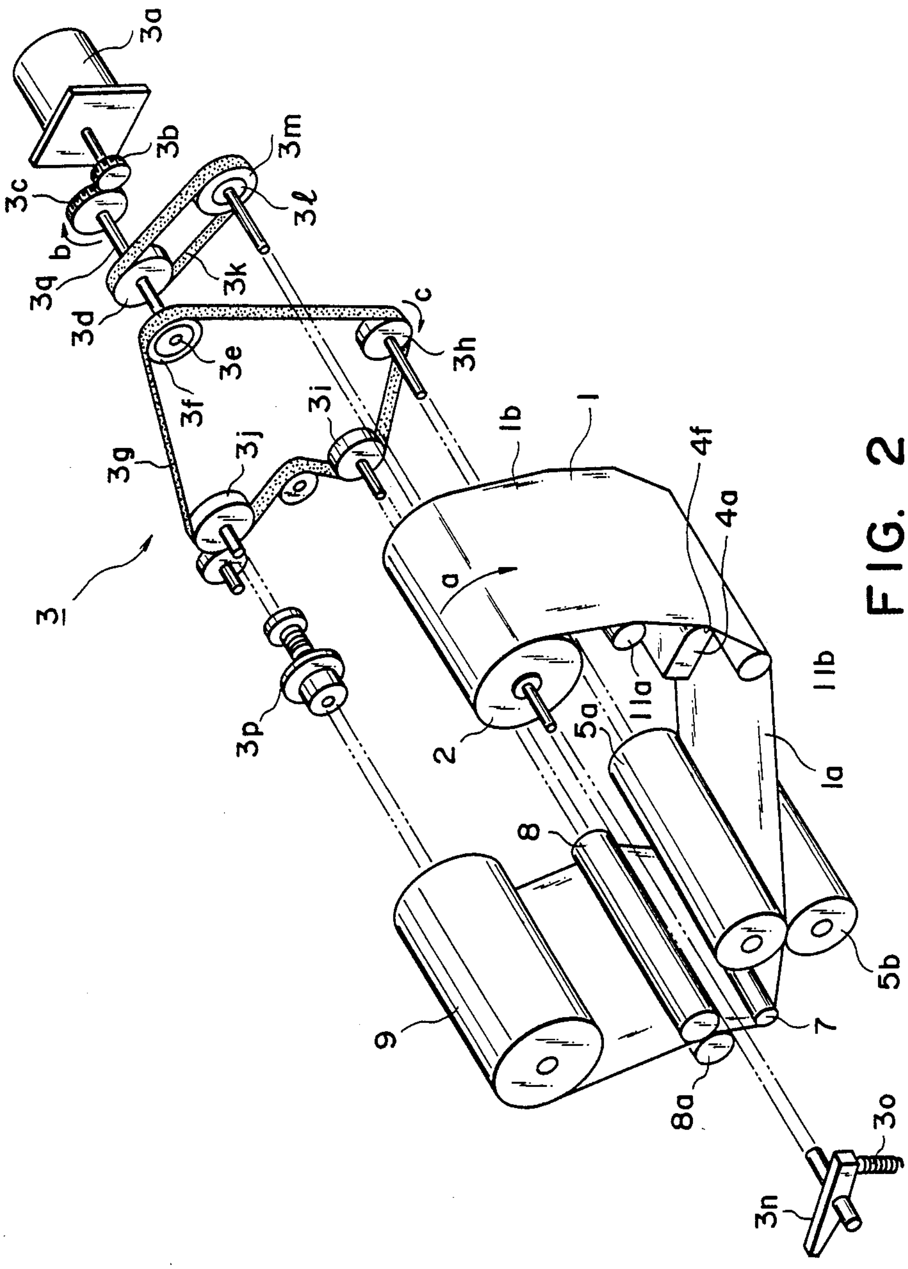
FIG. 2 is an explanatory diagram schematically illustrating a conveying means.

An embodiment of the present invention will now be described with reference to the accompanying drawings. FIG. 1 is a schematic diagram illustrating an image recording apparatus, while FIG. 2 is an explanatory diagram of a conveying means of a transfer recording medium. In the drawings, a sheet-like transfer recording medium 1 is loaded as a supply roll 2 wound up in the form of a roll (detachably loaded around a loading shaft *2a* of the main body of the apparatus). The transfer recording medium is conveyed from the supply roll 2 in the direction an arrow a by means of a conveying means 3. A latent image is formed on the transfer recording medium 1 by a recording section 4. The latent image is transferred onto a recording medium (e.g., plain paper or a plastic sheet for an OHP) 6 by a transfer section 5. After the transfer, the transfer recording medium 1 and the recording medium 6 are separated by a separation roller 7, and the transfer recording medium 1 is fed by a conveying roller 8 and taken up by a takeup roll 9. Subsequently, the recording medium 6 on which the image has been recorded is discharged onto a discharge tray 10. Incidentally, a cassette 12 accommodates the recording medium 6, which is fed to the transfer section by the rotation of a feed roller 13 on the side of the main body. In addition, a registration roller 14 conveys the recording medium 6 to the transfer section 5 in synchronization with the latent image formed on the transfer recording medium 1. Reference numeral 15 denotes a guide, while numeral 16 denotes a discharge roller.

Figure 3:
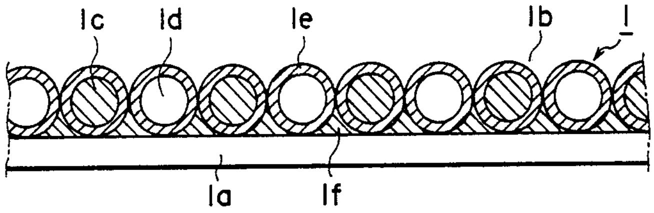
FIG. 3 is a diagram explaining the arrangement of a transfer recording medium.

A detailed description will now be made of the arrangement of the aforementioned respective parts. First, the transfer recording medium 1 is arranged such that an ink layer *1b*, which has properties capable of forming a latent image in cases where both heat and light energy is applied thereto, is adhered to a sheet-like substrate *1a*, as shown in FIG. 3.

As the transfer recording medium 1, those that are disclosed in the aforementioned specifications may be applied, but an example thereof will be given below. As shown in FIG. 3, the transfer recording layer *1b* is constituted by microcapsule-like image-forming elements formed by the following method using the components shown Tables 1 and 2 as cores *1c,1d*. In other words, 10 g of components shown in Tables 1 and 2 are mixed with 20 wt. % of methylene chloride, and this mixture is then mixed with 200 ml of water in which 1 g of gelatine and a cationic or nonionic surface active agent having an HLB value of at least 10 or above are dissolved. This mixture is agitated by a homo-mixer held at a temperature of 60° C. at a speed of 8000–10,000 r.p.m. to emulsify the same, thereby obtaining oily droplets having an average particle diameter of 26 μm. Furthermore, the mixture is further agitated for 30 minutes at 60° C., and the average particle diameter is reduced to approximately 10 μm by removing methylene chloride. 20 ml of water in which 1 g of gum arabic is dissolved is added to the same Subsequently, $NH_4OH$ (ammonium) is added to the mixture while cooling it gradually to set the pH to 11 or above, and a microcapsule slurry is thereby obtained. The walls of the microcapsules are hardened by gradually adding 1.0 ml of a 20% aqueous solution of glutaraldehyde to the same. Subsequently, the microcapsule slurry is separated into a solid and a liquid using a Nutsche funnel, and the solid is then dried by a vacuum cleaner for 10 hours at 35° C., thereby obtaining microcapsule-like image-forming elements. These image-forming elements are microcapsules in which the components 1*c*, 1*d* of Tables 1 and 2 are respectively covered with shells 1*e*, and are formed into a particle size of 7–15μm and an average particle size of 10 μm.

The image-forming elements thus formed are adhered on the substrate la constituted by a 6 μm-thick polyethylene terephthalate film, using an adhesive material 1*f* obtained by adding several droplets of a surface active agent to a 5% aqueous solution of PVA per 100 cc, thereby forming the transfer recording layer 1*b*. Thus the transfer recording medium 1 is arranged.

TABLE 1

| Item | Component | wt. % |
|---|---|---|
| Polymerizable prepolymer | $(CH_2{=}CHCOOCH_2.CH_2.O.CO$ 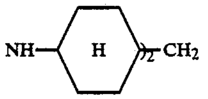  | 70 |
| Reaction initiator | Irgacure-907 (mfd. by Ciba-Geigy Corp.) | 11 |
| Binder | PMMA2041 | 17 |
| Colorant | Diazine Red K (mfd. By Mitsubishi Chemical industries, Ltd.) | 2 |

Figure 4:
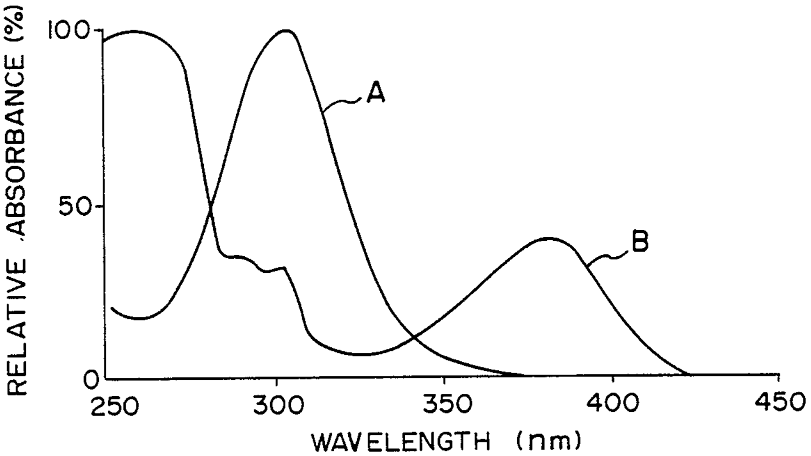
FIG. 4 is a diagram explaining the spectroscopic characteristics of reaction initiators contained in the transfer recording medium.

The reaction initiator shown in Table 1 above starts reaction by absorbing light in the range shown in Curve A in the spectroscopic characteristics of FIG. 4 and assumes a color of red at the time of image formation. Meanwhile, the reaction initiator shown in Table 2 starts reaction by absorbing light in the range shown by Curve B in the spectroscopic characteristics of FIG. 4 and assumes a color of blue at the time of image formation.

TABLE 2

| Item | Component | wt. % |
|---|---|---|
| Polymerizable prepolymer | $(CH_2{=}CHCOOCH_2.CH_2.O.CO$ 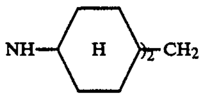  | 75 |
| Reaction initiator | 2-chlorothioxanthone/ethyl-P—dimethyl-amino-benzoate | 1.5/3 |
| Binder | PMMA2041 | 18.5 |
| Colorant | Diazine Blue K (mfd. by Mitsubishi Chemical Industries, Ltd.) | 2 |

Description will now be made of the conveying means 3 for conveying the transfer recording medium 1. As shown in FIG. 2, a gear 3*b* of a stepping motor 3*a* which is driven in response to signals from a control section (a microcomputer 20 shown in FIG. 7) is engaged with a gear 3*c*. In addition, a pulley 3*d* is secured to the gear 3*c* by means of a shaft 3*q*, and a pulley 3*f* is connected to the pulley 3*d* via a one-way clutch 3*e*.

Furthermore, three pulleys 3*h*, 3*i*, and 3*j* are installed in such a manner as to rotate in the same direction as the rotational direction of the pulley 3*f* via a belt 3*g*. The pulley 3*h* is connected to a transfer roller 5*a* of the transfer section 5. The pulley 3*i* is connected to the conveying roller 8, while the pulley 3*j* is connected to the takeup roll 9. Thus, the arrangement is such that rotational forces are transmitted in the same direction as that of the rotation of the respective pulleys 3*h*, 3*i*, and 3*j*.

A pulley 3*m* is connected to the pulley 3*d*, connected to the gear 3*c*, by means of a belt 3*k* and a one-way clutch 3*l*, and is arranged such that a rotational driving force is transmitted in the same direction as the rotational direction of the pulley 3*d*. The pulley 3*m* is connected to the supply roll 2 of the transfer recording medium 1, and the arrangement is such that the supply roll 2 rotates in the same direction as the rotational direction of the pulley 3*m*.

When the gear 3*c* rotates in the direction of the arrow b, the one-way clutch 3*e* provided to the pulley 3*f* assumes a locked state and transmits a rotational force to the pulley 3*f*, but, when the gear 3*c* rotates in the direction of −b wherein (the minus sign indicates a reverse direction) it slips and does not transmit the rotational force to the pulley 3*f*. On the other hand, the one-way clutch 3*l* is arranged such that when the gear 3*c* rotates in the direction of the arrow b, it slips and does not transmit a rotational force to the pulley 3*m*, and when the gear 3*c* rotates in the direction of −b, it assumes a locked state and transmits the rotational force to the pulley 3*m*.

A braking member 3*n* urged by a spring 3*o* is provided to the shaft of the supply roll 2 and is so arranged that a predetermined braking force is imparted to the rotation of the supply roll 2. Thus a predetermined back tension is applied to the conveyance of the transfer recording medium 1.

Next, description will be made of the recording section 4, which is comprised of a heating means and an irradiating means.

As for the heating means, for instance, an array of 8-dot/mm, A-4 size (209 mm×297 mm) heating elements 4*f* of the line type each having a width of 0.2 mm and adapted to generate heat in response to video signals (issued from the microcomputer 20 shown in FIG. 7) are arranged on the surface of a recording head 4*a*. The arrangement is such that the substrate 1*a* side of the transfer recording medium 1 conveyed by the conveying means 3 is held in pressure contact with the array of heating elements 4*f* by means of back tension during the aforementioned conveyance at a predetermined angle by means of guide rollers 11*a*, 11*b*.

Figure 5:
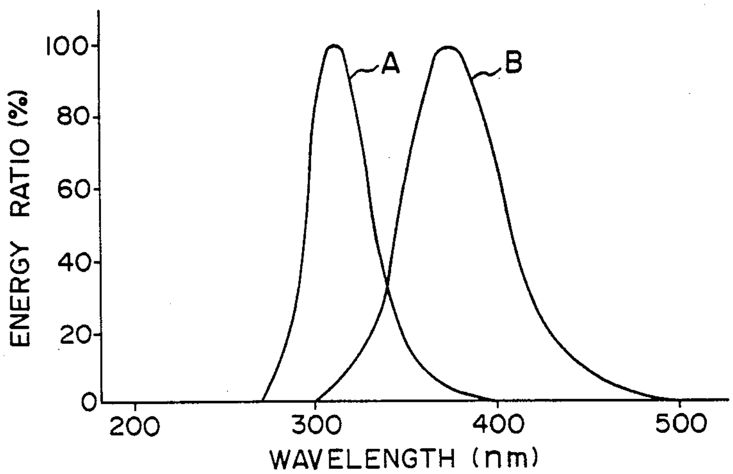
FIG. 5 is a diagram explaining the spectroscopic characteristics of a light source.

Meanwhile, two 20-Watt fluorescent tubes 4*b*, 4*c*, i.e., an irradiating means having the spectroscopic characteristics as shown in FIG. 5 are disposed at positions opposing the recording head 4*a* such as to be about 25 mm apart from the transfer recording medium 1. Furthermore, slit plates 4*d*, 4*e* are arranged in such a manner that an about 0.5 mm clearance exists between these slit plates 4*d*, 4*e* and the transfer recording medium 1 is maintained, while the width of their opening becomes 1.2 mm.

Incidentally, in this embodiment, as the fluorescent tube 4*b* having the spectroscopic characteristics shown by Curve A in FIG. 5, a 20-Watt health-ray fluorescent tube FL20SE made by Toshiba Corporation is used, while as the other fluorescent tube 4*c* having the spectroscopic characteristics shown Curve B, a 20-Watt copy-use fluorescent tube FL20BA-37 made by Toshiba Corporation is used.

Description will now be made of the transfer section 5. The transfer section 5 is disposed on the downstream side of the conveying direction of the transfer recording medium 1 during recording relative to the recording section 4, and is comprised of a transfer roller 5*a* rotating in the direction of an arrow d and a pinch roller 5*b* held in pressure contact with the transfer roller 5*a*, as shown in FIG. 1.

The transfer roller 5*a* is constituted by an aluminum roller with its surface coated with 1 mm-thick silicone rubber having a hardness of 70 degrees. The transfer roller 5*a* is so arranged that the temperature of its surface will be maintained in the range of 90°-100° by a 800-Watt halogen heater 5*c* incorporated therein. (In practice, the surface temperature of the roller 5*a* is detected by a temperature sensor 24 and is controlled by a CPU 20 shown in FIG. 7 in such a manner that the surface temperature will be held at the predetermined temperature.)

The pinch roller 5*b* is constituted by an aluminum roller with its surface coated with 1 mm-thick silicone rubber having a hardness of 70 degrees, and its pressing force relative to the transfer roller 5*a* is set to 12–15 kgf/cm$^2$.

Figure 7:
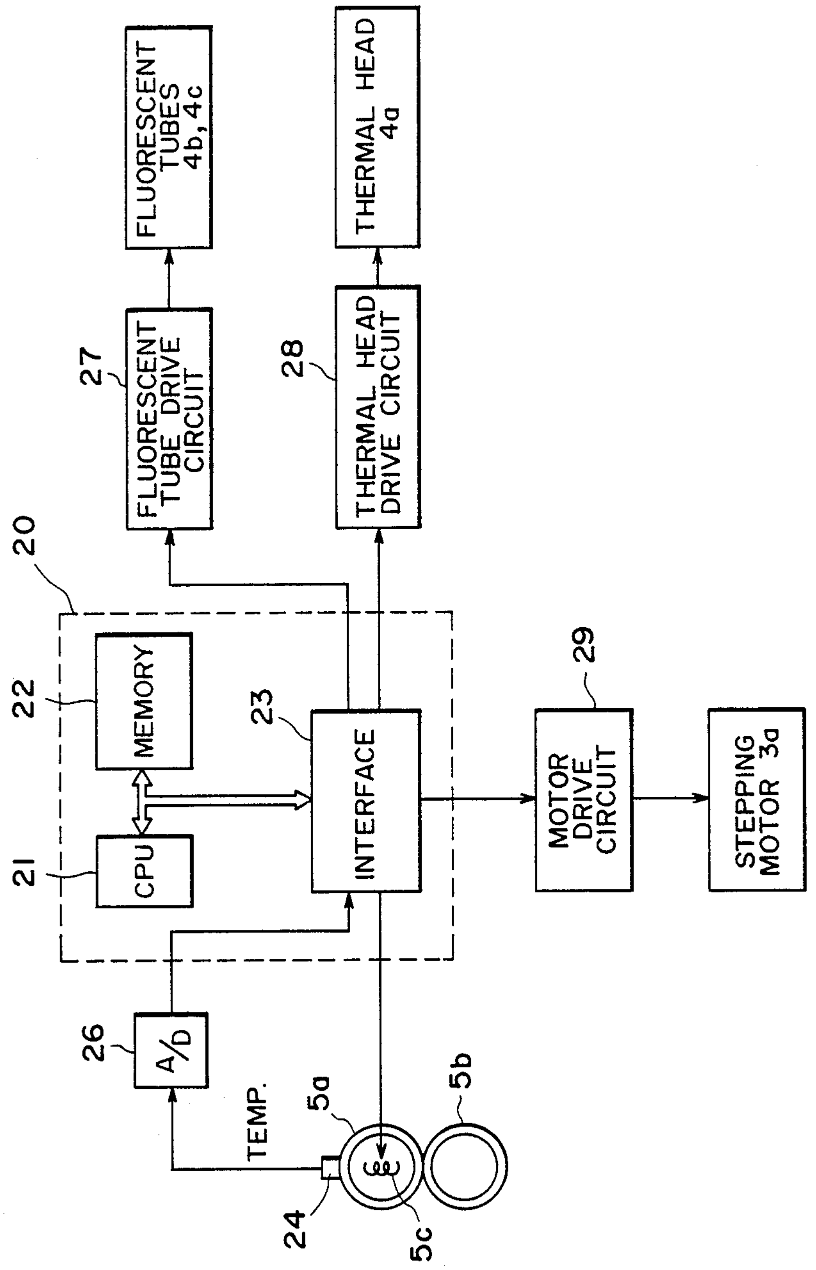
FIG. 7 is a block diagram illustrating control in accordance with the present embodiment.

Referring next to a block diagram of a control system shown in FIG. 7, description will be made of control of the image recording apparatus having the above-described arrangement.

Figure 6:
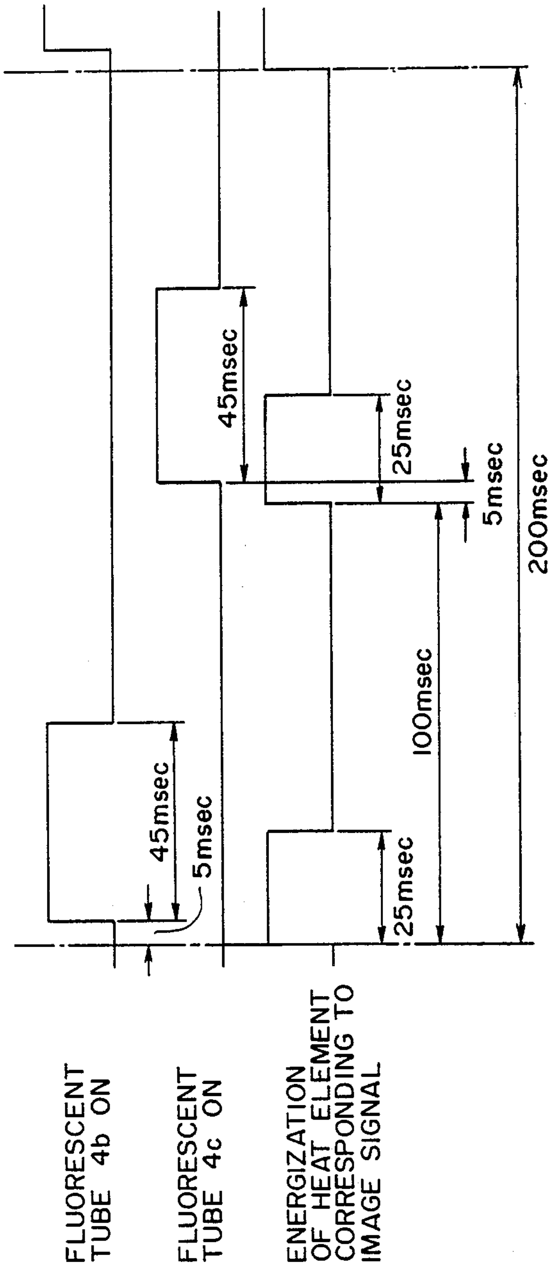
FIG. 6 is a timing chart for applying heat and light.

The control of the apparatus in accordance with this embodiment is effected by the microcomputer 20. This microcomputer is mainly comprised of a microprocessor 21, a memory 22, and an interface 23. A stepping motor 3*a*, i.e., a source for driving the conveying means, is driven as drive signals for executing the conveyance of the transfer recording medium 1, which will be described below, are transmitted from the interface 23 to a motor drive circuit 28. Similarly, a signals for lighting the fluorescent tubes 4*b*, 4*c*, i.e., the irradiating means, at a timing shown in FIG. 6 are also transmitted from the interface 23 to a fluorescent tube drive circuit 27, and signals for heating the thermal head 4*a* in correspondence with video signals are sent to a thermal head driven circuit 28. In addition, the interface 23 outputs signals for turning ON and OFF the heater 5*c* in the transfer roller 5*a*, detects the surface temperature of the roller 5*a* by the thermistor-type temperature sensor 24 as analog signals, and inputs the same as digital signals via an A/D converter 26.

In addition, in the memory 22 are stored the amount of rotation (set amount of rotation (1)) of the stepping motor 3*a* required in conveying a sheet of the transfer recording medium 1 of a given size (e.g., A-4 size, or B-5 size) in the forward direction in the direction from the recording section 4 to the transfer section 5 (i.e., in the recording direction) at the time when recording is effected on the recording medium, as well as an amount of rotation (set amount of rotation (2)) at the time when the transfer recording medium 1 is fed in the reverse direction, i.e., from the transfer section 5 to the recording section 4 (i.e., in the non-recording direction). Thus the rotation of the motor 3*a* is controlled with reference to the set values, as shown in a flowchart of control of conveyance (FIG. 8), which will be described later.

Incidentally, set values for each given size may be stored in a time table.

Description will now be made of operation in cases where recording is effected using the recording apparatus having the above-described arrangement.

As shown in FIG. 2, if the gear 3*c* is rotated in the direction of the arrow b by driving the stepping motor 3*a*, the one-way clutch 3*e* assumes a locked state, which in turn causes the pulley 3*f* to rotate, so that the belt 3*g* rotates in the direction of the arrow c. Consequently, the pulleys 3*h*, 3*i*, and 3*j* respectively rotate clockwise, so that the transfer roller 5*a*, the conveying roller 8, and the takeup roll 9 rotate clockwise. Consequently, the transfer recording medium 1 is consecutively fed in the direction of the arrow a while back tension is applied thereto from the supply roll 2. Also, front tension is imparted to the transfer recording medium 1 through slippage of a slip clutch 3*p*, thereby allowing the same to be taken up by the takeup roller 9.

Incidentally since the one-way clutch 3*l* slips at that time, a driving force is not transmitted to the supply roll 2.

Light and heat are imparted to the transfer recording layer 1*b* of the transfer recording medium 1 in the recording section 4 in correspondence with video signals (issued from the microcomputer 20 shown in FIG. 7), and a latent image is formed. In other words, the transfer recording layer 1*b* has a characteristic that, if heat and light of a predetermined wavelength are applied to the transfer recording layer 1*b*, its softening temperature rises, so that an image fails to be transferred onto the recording medium 6 by the transfer section 5.

Therefore, as shown of the timing chart in FIG. 6, at the time of red color recording, heating elements corresponding to video signals representing red are not energized, and portions corresponding to video signals representing white (the recording medium 6 is assumed to be white) are energized for 25 m.sec. Those portions are uniformly irradiated with the light of the fluorescent tube 4*b* with a time lag of 5 m.sec. At this juncture, the irradiation time is set to 45 m.sec.

Then, at the time of effecting blue color recording, after a pulse of 50 m.sec. upon completion of the irradiation, i.e., in 100 m.sec. from the time of starting energization, heating elements corresponding to video signals representing blue are not energized, and those portions corresponding to video signals representing white are energized for 25 m.sec. and are irradiated uniformly with the light of the fluorescent tube 4*c* with a time lag of 5 m.sec. The irradiation time at this juncture is 45 m.sec. as in the above.

A negative latent image is formed by controlling the recording head 4*a* in correspondence with the video signals representing red, blue and white in the procedure as described above. The transfer recording medium 1 is conveyed by the rotation of the conveying roller 8 and the pinch roller 8*a* driven by the same in synchronization with a repeated cycle of 200 m.sec./line. When the transfer recording layer 1*b* on which the latent image has been formed is held in pressure contact with the recording medium 6 and heated in the transfer section 5, the transferred image of the two colors of red and blue are transferred onto the recording medium 6. Subsequently, the transfer recording medium 1 and the recording medium 6 are separated by a release roller 7, and the recording medium 6 for which the transfer of the image has been completed is discharged onto the discharge tray 10.

In the above-described transfer recording process, transfer recording is completed at the point of time when the rear end of the latent image is released from the recording medium 6 by the release roller 7. However, the portion of the transfer recording medium 1 between the recording section 4 to the release roller 7 remains unused (i.e., a latent image is not formed).

In this embodiment, when the rear end of the latent image formed on the transfer recording medium 1 is conveyed to the position of the release roller 7 and is released from the recording medium 6, the stepping motor **3*a* shown in FIG. 2 rotates in the opposite direction of the aforementioned case by means of a signal issued from the control section (i.e , the microcomputer 20 shown in FIG. 7), so that the gear 3*c*** rotates in the direction of the arrow −b.

At that time, since the one-way clutch **3*e* slips a driving force is not transmitted to the pulley 3*f*. However, the other one-way clutch 3*l* assumes a locked state, so that the pulley 3*m* rotates counterclockwise, and this rotational force is transmitted to the supply roll 2**.

Accordingly, the supply roll 2 rotates in the direction of the arrow -a to wind back the transfer recording medium 1, and when the position of the rear end of the latent image is wound back to the position of the recording head **4*a* from the position of the release roller 7, the motor 3*a*** stops, thereby completing the entire transfer recording process.

Figure 8:
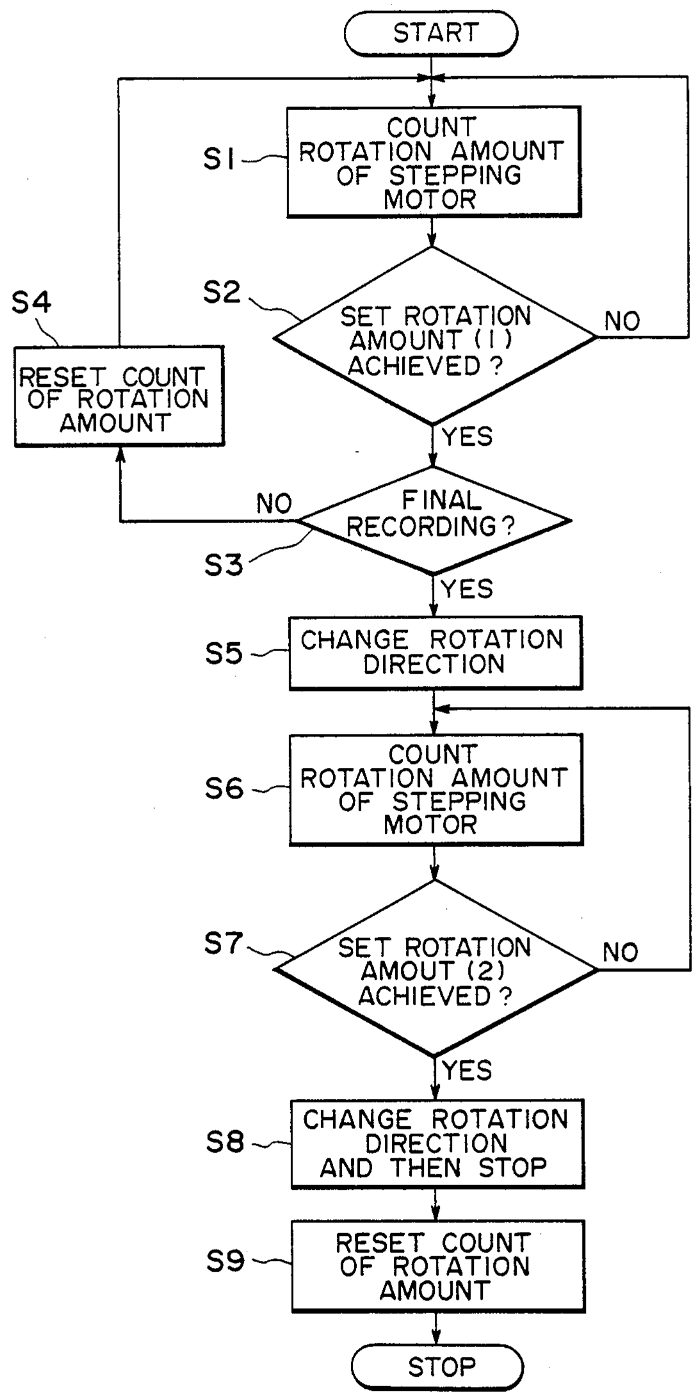
FIG. 8 is a flowchart thereof.

A more detailed description will be made of the above-described control with reference to the flowchart shown in FIG. 8.

First, on starting of recording, the stepping motor **3*a* is rotated in the forward direction in such a manner that the transfer recording medium 1 will be conveyed in the direction of a (this direction shall be called the forward direction or recording direction) shown in FIG. 1, and the cumulative amount of rotation is counted up (Step S1). Then, while recording is in progress, discrimination is made as to whether or not the aforementioned amount of rotation has reached a set amount of rotation (1) (Step S2). If it has not reached the set amount of rotation (1), the motor 3*a* is rotated continuously to conveying the transfer recording medium 1. If the amount of rotation has reached the set amount of rotation (1), discrimination is made as to whether or not recording at this time coincides with the final value of the number of sheets to be recorded which has been designated by the operator (Step S3). At that juncture, if it is not the final recording, the cumulative amount of rotation is reset, and the operation returns to Step S1 (Step S4). In addition, in the case of the final recording, the rotational direction of the motor 3*a* is changed over to the reverse direction so as to convey the transfer recording medium 1 in the direction of b (this direction shall be called the reverse direction or nonrecording direction) shown in FIG. 1 (Step S5). Then, the amount of rotation of the motor 3*a* after conveying the transfer recording medium 1 in the reverse direction is counted up (Step S6). Then, discrimination is made as to whether or not the amount of rotation of the motor 3 has reached the set amount of rotation (2) (Step S7). If the amount of rotation has not reached the set amount of rotation (2), the motor 3*a* is rotated continuously in the reverse direction to continue the winding up of the transfer recording medium 1. On the other hand, if the amount of rotation has reached the set amount of rotation (2), the rotational direction of the motor 3*a* is changed over to the forward direction and the motor 3*a* is then stopped (Step S8). In addition, the count of the amount of rotation of the motor 3*a* required in conveying the transfer recording medium 1 in the reverse direction is reset (Step S9**).

It should be noted that the set amount of rotation (1) referred to herein means the (cumulative) amount of rotation of the motor **3*a* required in conveyance until the rear end of the latent image-forming portion of the transfer recording medium 1 is completely released from the recording medium 6 (i.e., until it passes through the release roller 7). This set amount of rotation (1) varies in accordance with the various sizes of the recording medium 6, and may be stored in a time table or the like, as mentioned earlier. In addition, the set amount of rotation (2) means the (cumulative) amount of rotation of the motor 3*a* required in conveying the rear end of the trace of the latent image-forming portion remaining on the transfer recording medium 1 (the trace in which the transfer recording layer 1*b* has been transferred onto the recording medium 6 by the transfer section 5) from the point of changeover of the rotation of the motor 3*a* up to slightly before or immediately before the recording head 4*a*. Incidentally, the set amount of rotation (2)** may be determined, as necessary.

Hence, in accordance with this embodiment, if the next recording is started, it is possible to form a latent image without leaving an unused portion in the transfer recording medium 1.

As described above, by controlling the forward and reverse conveyance of the transfer recording medium 1, it becomes possible to effectively utilize the transfer recording medium 1 without waste by reducing the unused area on the transfer recording medium 1.

Incidentally, although in the present embodiment an example has been shown in which the transfer recording medium is fed in the reverse direction immediately after recording of the final image, the present invention should not be restricted to the aforementioned embodiment. For instance, an arrangement may be provided such that the apparatus is stopped as it is after the recording of the final image, and the transfer recording medium may be fed in the reverse direction prior to starting the next new image recording.

In reverse feeding the transfer recording medium 1, since the number of lines from the release roller 7 to the recording head **4*a* is fixed, it is readily possible to control the amount of rotation of the stepping motor 3*a***.

It should be noted that although, in the above-described embodiment, description has been given in the case of two-color recording, it is also possible to effect transfer recording of a single or full-color image by selecting, as required, the kinds of a colorant and a reaction initiator constituting image-forming elements and by selecting a light source of a wavelength necessary for the reaction of the reaction initiator.

In addition, although the arrangement is such that, in the recording section 4, light of a predetermined wavelength is applied uniformly from the transfer recording layer lb side of the transfer recording medium 1, and heat in correspondence with video information is applied from the substrate **1*a* side, it is also possible to provide an arrangement as another embodiment in which heat is applied uniformly, and light of a predetermined wavelength is applied in correspondence with video information. Furthermore, an arrangement may be provided such that light is applied from the substrate la side by forming the substrate la with a light-transmissive material, and heat is applied from the transfer recording layer 1***b* side.

Moreover, although in the above-described embodiment irradiation and heating are carried out by placing the substrate 1 in between, it is also possible to effect image formation by conducting both irradiation and heating from one side of the substrate 1*a*.

As for the material of the substrate 1*a*, polyamide, polyamide-imide, etc. may also be used in addition to the aforementioned polyethylene terephthalate.

As for the irradiating means, in addition to the aforementioned method of using the fluorescent tubes 4*b*, 4*c*, it is also possible to employ, for instance, a method in which an LED array is used, or one which a xenon lamp and a filter which has matching light absorption characteristics in terms of its material.

As for the heating means, it is also possible to employ a method in which heating is carried out selectively using a YAG laser and a polygon mirror, in addition to the method of using the aforementioned recording head.

Furthermore, as for the recording medium, for instance, a plastic sheet and the like for an overhead projector (OHP) may be used in addition to paper.

Although, in the above-described embodiment, light energy and heat energy are applied simultaneously to the transfer recording layer 1*b*, an arrangement may be provided such that light energy and heat energy are applied separately, as both energizes are applied ultimately.

the above-described embodiment, transfer recording is effected by forming a transferred image based on a difference in the transfer recording characteristics with respect to the recording medium due to the change in the softening temperature of the image-forming elements of a high molecular material containing a colorant by the use of light energy and heat energy. However, it goes without saying that an arrangement may be provided such that a transferred image is transfer-recorded onto the recording medium by forming a transferred image based on a difference in the sublimation characteristics in respect of the recording medium, or such a transferred image that will change the coloring characteristics of the recording medium. It is also possible to adopt an arrangement in which such a recording medium that will directly undergo coloration by means of light and heat energy, instead of forming a transferred image, is used in the manner of the transfer recording medium.

As described above, since the present embodiment is capable of imparting both light and heat to the transfer recording medium in the recording section, it is possible to use an opto- and thermo-sensitive transfer recording medium and form an image thereon, thereby forming a single- or full-color recording. In addition, since a transferred image formed in the recording section is transferred separately in the transfer section, it becomes possible to effect transfer positively.

Furthermore, since the conveying means of the transfer recording meidum is capable of reversely feeding the transfer recording medium, it is possible to wind back the transfer recording medium which has been conveyed in an unused state from the recording section to the transfer section after completion of the image formation. Consequently, it is possible to effectively utilize the transfer recording medium, i.e., an expendable, without causing the same to produce an unused portion.

As described above, the present invention provides an image recording apparatus which is capable of using the transfer recording medium effectively.

What is claimed is:

1. An image recording apparatus comprising:

a recording section disposed along a conveyable route of a transfer recording medium having a transfer recording layer whose transfer characteristics change when a first energy and a second energy different from said first energy are applied thereto, said recording section including first energy applying means for applying said first energy to said transfer recording medium and second energy applying means for applying said second energy thereto;

transfer means for transferring an image formed on said transfer recording medium in said recording section onto a recording medium; and conveying means capable of conveying said transfer recording medium in the direction from said recording section to said transfer section and vice versa.

2. An image recording apparatus according to claim 1, wherein said transfer recording medium is detachably mounted on a main body of said apparatus.

3. An image recording apparatus according to claim 1, wherein said first energy is heat.

4. An image recording apparatus according to claim 1, wherein said second energy is light.

5. An image recording apparatus according to claim 1, wherein the change in said transfer characteristics is in respect of softening temperature.

6. An image recording apparatus according to claim 1, further comprising tension imparting means for imparting tension to said transfer recording medium in such a manner that said transfer recording medium will press said first energy applying means.

7. An image recording apparatus according to claim 1, wherein said transfer recording medium is conveyed in a direction from said recording section to said transfer section until the rear end of an image-forming portion of the final recording of said transfer recording medium is released from said recording medium.

8. An image recording apparatus according to claim 1, wherein said transfer recording medium is conveyed in a direction from said transfer section to said recording section after the rear end of an image-forming portion of the final recording of said transfer recording medium is released from said recording medium.

9. An image recording apparatus according to claim 1, wherein said transfer recording medium is conveyed in a direction from said transfer section to said recording section until the rear end of an image-forming portion of the final recording of said transfer recording medium after the transfer of the final recording reaches a position immediately before the recording position of said recording section.

10. An image recording apparatus comprising:

conveying means capable of conveying a transfer recording medium having a transfer recording layer whose transfer characteristics change on application of a first energy and a second energy different from said first energy thereto;

a recording section having first and second energy applying means disposed along a conveying path for said transfer recording medium conveyed by said conveying means, said first and second energy applying means each applying said first energy and said second energy to said transfer record medium;

a transfer section for transferring an image formed on said transfer recording medium in said recording section onto a recording medium; and control means for controlling such that said conveying means conveys said transfer recording medium either in a recording direction from said recording section to said transfer section or in a non-recording direction from said transfer section to said recording section

11. An image recording apparatus according to claim 10, wherein said transfer recording medium is detachably mounted on a main body of said apparatus.

12. An image recording apparatus according to claim 10, wherein said first energy is heat.

13. An image recording apparatus according to claim 10, wherein said second energy is light.

14. An image recording apparatus according to claim 10, wherein the change in said transfer characteristics is in respect of softening temperature.

15. An image recording apparatus according to claim 10, further comprising tension imparting means for imparting tension to said transfer recording medium in such a manner that said transfer recording medium will press said first energy applying means.

16. An image recording apparatus according to claim 10, wherein said transfer recording medium is conveyed in a direction from said recording section to said transfer section until the rear end of an image-forming portion of the final recording of said transfer recording medium is released from said recording medium.

17. An image recording apparatus according to claim 10, wherein said transfer recording medium is conveyed in a direction from said transfer section to said recording section after the rear end of an image-forming portion of the final recording of said transfer recording medium is released from said recording medium.

18. An image recording apparatus according to claim 10, wherein said transfer recording medium is conveyed in a direction from said transfer section to said recording section until the rear end of an image-forming portion of the final recording of said transfer recording medium after the transfer of the final recording reaches a position immediately before the recording position of said recording section.

19. An image recording apparatus comprising:

a recording section disposed along a conveyable route of a transfer recording medium having a transfer recording layer and adapted to form an image on said transfer recording layer;

a transfer section for transferring onto a recording medium an image formed on said transfer recording layer in said recording section; and conveying means capable conveying said transfer recording medium in a direction from said recording section to said transfer section and vice versa.

20. An image recording apparatus for recording an image onto a medium to be recorded, comprising:

a conveying means capable of conveying a transfer recording medium having a transfer recording layer, the transfer characteristics of which vary upon application of one or more kinds of energy;

an image forming section provided along a conveyance path in which said transfer recording medium is conveyed by said conveying means so as to apply said energy to said transfer recording medium to form an image on said transfer recording medium;

a visible image forming section for forming a visible image on said recording medium in accordance with said image formed on said transfer recording medium at said image forming section; and control means for controlling said conveying means in such a manner that said transfer recording medium which passes through said image forming section without said image formed on said image recording medium returns to a direction of said image forming section.

21. An image recording apparatus according to claim 20, wherein said transfer recording medium and said recording medium are applied with thermal energy in a condition where both media are in contact with said visible image forming section.

22. An image recording apparatus according to claim 20, wherein said transfer recording medium and said recording medium are applied with pressure in a condition where both media are in contact with said visible image forming section.

23. An image recording apparatus according to claim 20, wherein said energy is optical energy.

24. An image recording apparatus according to claim 20, wherein said energy is thermal energy.

25. An image recording apparatus according to claim 20, wherein said energy is controlled in response to image information.

26. An image recording apparatus according to claim 20, wherein said transfer characteristics vary in accordance with variation in softening temperature.

27. An image recording apparatus for recording an image onto a medium to be recorded, comprising:

conveying means capable of conveying a transfer recording medium having a transfer recording layer, the transfer characteristics of which vary upon application of optical energy and thermal energy;

a recording section provided along a conveyance path in which said transfer recording medium is conveyed by said conveying means, said recording section having light illuminating means for applying said optical energy and heating means for applying said thermal energy to said transfer recording medium;

a transfer section for transferring an image formed on said transfer recording medium onto said recording medium at said recording section; and control means for controlling such that said conveying means conveys said transfer recording medium either in a recording direction from said recording section to said transfer section or in a non-recording direction from said transfer section to said recording section.

28. An image recording apparatus according to claim 27, wherein said transfer characteristics vary in accordance with variation in softening temperature.

* * * * *

UNITED STATES PATENT AND TRADEMARK OFFICE

CERTIFICATE OF CORRECTION

PATENT NO. : 4,891,652

DATED : January 2, 1990

INVENTOR(S) : TADASHI SATO, ET AL.

It is certified that error appears in the above-identified patent and that said Letters Patent is hereby corrected as shown below:

COLUMN 1

Line 20, "has been recently" should read --has recently--.
Line 22, "as well" should be deleted.
Line 42, "The" should read --the--.

COLUMN 2

Line 62, "energy applying" should read --energy to the transfer recording medium and a second energy applying--.

COLUMN 3

Line 60, "comprising" should read --comprising:--.

COLUMN 6

Line 32, "wherein (the" should read --(wherein the--.

COLUMN 8

Line 26, "Incidentally" should read --Incidentally,--.

COLUMN 9

Line 23, "slips" should read --slips,--.

UNITED STATES PATENT AND TRADEMARK OFFICE
CERTIFICATE OF CORRECTION

PATENT NO. : 4,891,652

DATED : January 2, 1990

INVENTOR(S) : TADASHI SATO, ET AL.

It is certified that error appears in the above-identified patent and that said Letters Patent is hereby corrected as shown below:

COLUMN 11

Line 34, "as both energizes are" should read -- as so long as both are--.

Line 36, "the" should read --In the--.

COLUMN 13

Line 15, "section" should read --section.--.

Signed and Sealed this

Twenty-fifth Day of June, 1991

Attest:

HARRY F. MANBECK, JR.

Attesting Officer

Commissioner of Patents and Trademarks